United States Patent
Mattox et al.

(10) Patent No.: US 7,719,684 B2
(45) Date of Patent: May 18, 2010

(54) METHOD FOR ENHANCING POLARIMETER SYSTEMS THAT USE MICRO-POLARIZERS

(75) Inventors: Barry G. Mattox, Orlando, FL (US); Gene D. Tener, Oviedo, FL (US)

(73) Assignee: Lockheed Martin Corporation, Bethesda, MD (US)

(*) Notice: Subject to any disclaimer, the term of this patent is extended or adjusted under 35 U.S.C. 154(b) by 301 days.

(21) Appl. No.: 12/007,350

(22) Filed: Jan. 9, 2008

(65) Prior Publication Data

US 2008/0165359 A1    Jul. 10, 2008

Related U.S. Application Data

(60) Provisional application No. 60/879,326, filed on Jan. 9, 2007.

(51) Int. Cl.
*G01J 4/00* (2006.01)
(52) U.S. Cl. ..................................... 356/367
(58) Field of Classification Search ............. None
See application file for complete search history.

(56) References Cited

U.S. PATENT DOCUMENTS

| H741 H | 2/1990 | Powell et al. |
| 6,438,274 B1 | 8/2002 | Tokuyama et al. |
| 6,798,511 B1 | 9/2004 | Zhan et al. |
| 7,016,550 B2 * | 3/2006 | Alderson et al. ............ 382/274 |
| 2008/0212895 A1 * | 9/2008 | Mattox ...................... 382/294 |

* cited by examiner

*Primary Examiner*—Gregory J Toatley, Jr.
*Assistant Examiner*—Juan D Valentin
(74) *Attorney, Agent, or Firm*—Birch, Stewart, Kolasch & Birch, LLP

(57) ABSTRACT

This invention solves a problem of registration and improves signal-to-noise ratio (SNR) when using division-by-focal-plane array to produce multiple polarization images. This is achieved by processing a sequence of angular-position-dithered frames to generate a high-definition, Nyquist-sampled, integrated image for each of the polarizations. The integration method transforms individually under-sampled, high-resolution image frames into resultant high-resolution frames that meet the Nyquist sampling criterion. During the resampling transformation, each polarization or waveband is resampled to produce precise registration to the other polarizations, since registration offsets are fixed and defined by the arrangement of the polarized pixels in the focal-plane-array. In the most straight-forward implementation, these offsets would be integer pixel shifts in X and Y.

21 Claims, 8 Drawing Sheets

130 Align and Up-Sample Processor (for each channel, P)

Under-Sampled Input Image

$I_{in,P}(m,n)$

Pixels represent a single polarization response after integrating frames over multiple dither positions in a frame set $I_{out,P}(x,y)$ Image Resampler at Up-Sampled, Shifted Positions $\Delta X, \Delta Y$ ← 132

Nyquist-Sampled and Aligned to H Channel Reference Frame

Dither Shift Estimate $S_x, S_y$

Channel Offset Adder

Dark pixels represent a single polarization response for one frame (one dither position)

$(X_{offset}, Y_{offset}) = \begin{cases} (0, 0) & \text{for P = H channel} \\ (-1, 0) & \text{for P = V channel} \\ (-1, -1) & \text{for P = +45° channel} \\ (0, -1) & \text{for P = +45° channel} \end{cases}$

↑ 131

METHOD FOR ENHANCING POLARIMETER SYSTEMS THAT USE MICRO-POLARIZERS

This application claims priority to the U.S. Provisional Application No. 60/879,326 filed on Jan. 9, 2007 entitled "ENHANCING POLARTIMETER SYSTEMS USING MICRO-POLARIZERS", which is incorporated herein by reference.

FIELD OF INVENTION

The present invention relates to image processing methods, systems, and algorithms that process polarimetric imagery with the purpose of providing high-quality high-resolution polarized imagery that may be used, for example, by subsequent processes to detect and/or classify targets embedded in the imagery. Well known detection and/or classification processes (whether by human observers or by automated methods) may be applied with the inventive image processing.

BACKGROUND

There are numerous challenges that must be addressed to provide accurate detection and classification of possible targets based on imagery data. One such challenge is distinguishing targets from the surrounding/background environment. For example, in infrared imagery, the intensities of target signatures may differ very little from that of the background, especially at times of the day when the background and target temperatures are similar. On the other hand, detection algorithms that discriminate targets from background on the basis of target intensity can produce false detections due to the presence of particularly hot or cold objects, including fires or heated objects. To increase the probability of correctly detecting desired targets and rejecting decoys and incidental false alarms, additional target feature data are desirable. Features that can lead to improved probabilities of detection or correct classification includes polarization characteristics for the image of the target.

Polarimetric imaging is a production of multiple images, wherein each image is a response to a particular polarization of light. One of the advantages of using the polarimetric imaging in detecting and classifying targets in an image is target specificity. In particular, man-made objects typically emit and/or reflect linearly polarized light to a greater degree than natural background clutter. In addition, a polarization angle can be used to infer an angular aspect of target surfaces when the target is resolved into multiple pixels in the image. Although polarizations can generally be described as linear, circular, or elliptical, the most useful polarizations for target detection and classification are linear polarizations at different angles or metrics that can be directly related to linear metrics. Stokes Parameters are often used to describe the polarization characteristics of light. The Stokes Parameters related to linear measurements are often described by the following relationship:

$$S_0 = I_H + I_V \text{ or } S_0 = (I_H + I_V + I_{+45} - I_{-45})/2 \quad (1)$$

$$S_1 = I_H - I_V$$

$$S_2 = I_{+45} - I_{-45}$$

$$DOLP = \frac{\sqrt{S_1^2 + S_2^2}}{S_0} \text{ and } AOLP = \frac{1}{2}\tan^{-1}\left(\frac{S_2}{S_1}\right)$$

where $I_H$, $I_V$, $I_{+45}$, and $I_{-45}$ are linear measurements at 0, 90, 45, and −45 degrees, respectively, and the Stokes Parameters $S_0$, $S_1$, and $S_2$ are measures of unpolarized, horizontal/vertical, and diagonal polarizations respectively. DOLP is a degree of linear polarization, and AOLP is the angle of linear polarization.

Construction of high-quality polarization imagery data is not without challenges. The process of separating and processing the responses to the polarized components of light can produce images that suffer from poor signal-to-noise ratio (SNR), poor polarization isolation, and inaccurate registration of the multiple polarization images with respect to one another.

There are numerous ways of implementing polarimeters to obtain polarimetric imagery data including time division, amplitude division, aperture division, and focal-plane-division. Each implementation has advantages and disadvantages.

For example, the time division implementation typically requires sequential collection of multiple linear polarization images by rotating a linear polarizing filter in front of the imaging device. The SNR for any polarization component is typically low compared with the total energy of all polarizations. The time division implementation has the advantage of being relatively simple and the registration among polarizations may not be an issue, since the image detector array itself requires no mechanical movement. However, time delays between each polarization may cause polarization registration issues if either the target or the detector is moving.

The amplitude division method divides a single light path into four paths by means of beam splitters. Each divided path is processed through polarization filters before reaching its respective detector array. In this case the SNR is reduced due to both the polarization filters and the beam splitters. In addition, registration of the individual polarization components may be challenging, especially over temperature variations and mechanical vibration. This type of system is also expensive and bulky; however, the amplitude division method does provide good resolution and minimal motion artifacts, since all polarizations are derived simultaneously.

The aperture division method sub-divides a physical aperture such that each sub-aperture is filtered for a single polarization. Similar to previous methods above, the SNR is reduced due to polarization filtering and also due to the reduced energy collected by the smaller sub-aperture. In addition, the resolution of the image is typically reduced by a factor of at 2 in both the x-direction and the y-direction due to the reduced size of each of the sub-apertures assigned to each polarization sensor.

The focal-plane-array, (FPA) implementation uses four micro-polarizers in a 2×2 array resolvable into 4 sub-pixels as shown in FIG. 1, each with a different polarization filter. Similar to previous methods above, the SNR is reduced due to the polarization filtering. In order for all four of the sub-pixels to respond to a commonly resolvable image, the system is designed so that the point spread function (PSF) encompasses four sub-pixels. This dilutes the received energy per polarization by another factor of four compared with a PSF that is matched to a single pixel. In addition, the resolution of the image is reduced by a factor of 2 in both the x-direction and the y-direction due to the larger PSF. The four polarized images derived from the FPA are naturally mis-registered by half of the resolvable pixel width (or by one sub-pixel interval) in x and/or y, but this relative registration is fixed and known. In this system, target or sensor motion does not cause additional registration problems.

In many applications, the polarimetric imagery acquisition methods described above yield inadequate SNR. All of the methods described above sacrifice resolution and/or registration stability or accuracy. The micro-polarizer FPA implementation appears to yield a favorable combination of stable relative registration, simplicity, low-volume, and low cost. Since the FPA uses individually dedicated image sensors (sub-pixels) with a fixed geometric arrangement between polarization elements, the registration of the polarization images is stable and known. In addition, motion artifacts caused by a moving target or sensor are minimized since there is no time delay between each polarization image. However, the conventional system design using the micro-polarizer FPA suffers from less than optimum resolution and an additional SNR loss, since the PSF is sized to illuminate four pixels in order to obtain all polarization measurements. This results in degradation of resolution by factor of 2 in each spatial direction and reduction of SNR by factor of 4 in addition to the necessary loss of energy due to the polarizing filters.

SUMMARY OF INVENTION

Embodiments of the subject invention include an adaptation of a micro-polarizer FPA imager. It employs image registration and integration processing of successive images to allow the PSF of the sensor to match that of the individual sub-pixel. This overcomes both resolution and SNR problems associated with a larger PSF. In addition, the integration provides additional SNR enhancement. Thus, in most applications, the characteristics of this invention are superior to those of the four conventional methods described above.

A preferred embodiment of the invention addresses the problems of low SNR, degraded resolution, and polarimetric mis-registration when using a micropolarizer FPA. These objectives are achieved by processing a sequence of frames that are intentionally dithered in x and/or y angular directions to generate a high-resolution, Nyquist-sampled, integrated image. Since the PSF for the subject invention is designed to closely match the dimensions of the individual pixel (rather than a group of 4 pixels), each of the polarized images (made up of ¼ of the FPA pixels) will be under-sampled by about a factor of two in each dimension. This is because, in each dimension, the spacing between the pixels of a given polarization image are spaced by two sub-pixel intervals and the PSF is sized to approximately one sub-pixel interval.

Aspects of the invention involve collecting a set of angular-position-dithered images, registering all of the images in the set to one another, interpolating each of the under-sampled images to a higher (typically double) sampling rate, and integrating them to form a resulting image. The resulting integrated images are Nyquist-sampled with improved SNR.

The method of integration transforms individually under-sampled, high-resolution frames into resultant high-resolution frames that meet the Nyquist sampling criterion. This is possible because, although each individual frame of a set of images contains aliasing distortion or "aliasing noise," the distortion is random from one frame to another (due to the differing dither positions), and both this aliasing noise and the inherent sensor noise are reduced to an acceptable level by the integration factor (approximately the square-root of the number of frames in the set). Each polarization image, having been transformed in this manner, is offset from the other polarization images by a precise angular shift. The registration shifts among polarizations are simply the fixed offsets defined by the arrangement of the polarized subpixels of the micro-polarizer focal plane. In the most straight-forward implementation, these shifts are integer pixel shifts in x and y.

A preferred embodiment of the invention overcomes the problem of under-sampling of each of the polarization images (and the resulting aliasing noise) using a dithered frame-integration approach that allows the PSF to be matched to the individual detector element size, thus providing near-optimum resolution and SNR. The integrated polarization images produced are Nyquist-sampled with sample points corresponding to the centers of all of the individual detectors, so that the registration of one polarization image to another is simplified (e.g. a unit-pixel shift in x and/or y direction(s)). The registration is essentially perfect and the SNR is greatly improved, both by the smaller PSF and by the effects of integration. The number of pixels in each of the resulting polarized images is the total number of individual detector elements, so that the full vector complement of polarimetric information is available for each pixel position.

The preferred embodiment of the invention integrates either a randomly-dithered or pattern-dithered angular movement of the field of view. The dither typically should extend over two or more sub-pixel extents in both x and y during the collection of a set of frames that are processed (integrated) together. However, the precise characteristic of the dither has not been shown to be critical. It is even sufficient to pan the field of view in a linear motion as long as a number of fractional sub-pixel positions in both x and y are traversed while collecting the images that are integrated together in the process. In some applications, sufficient dither may be introduced by the vibration characteristics of the sensor platform.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF DRAWINGS

The present invention will become more fully understood from the detailed description given hereinbelow and the accompanying drawings which are given by way of illustration only, and thus are not limitative of the present invention, and wherein.

DETAILED DESCRIPTION

The following detailed description of the invention refers to the accompanying drawings. The same reference numbers in different drawings identify the same or similar elements. Also, the following detailed description does not limit the invention. Instead, the scope of the invention is defined by the appended claims and equivalent thereof.

Figure 2:
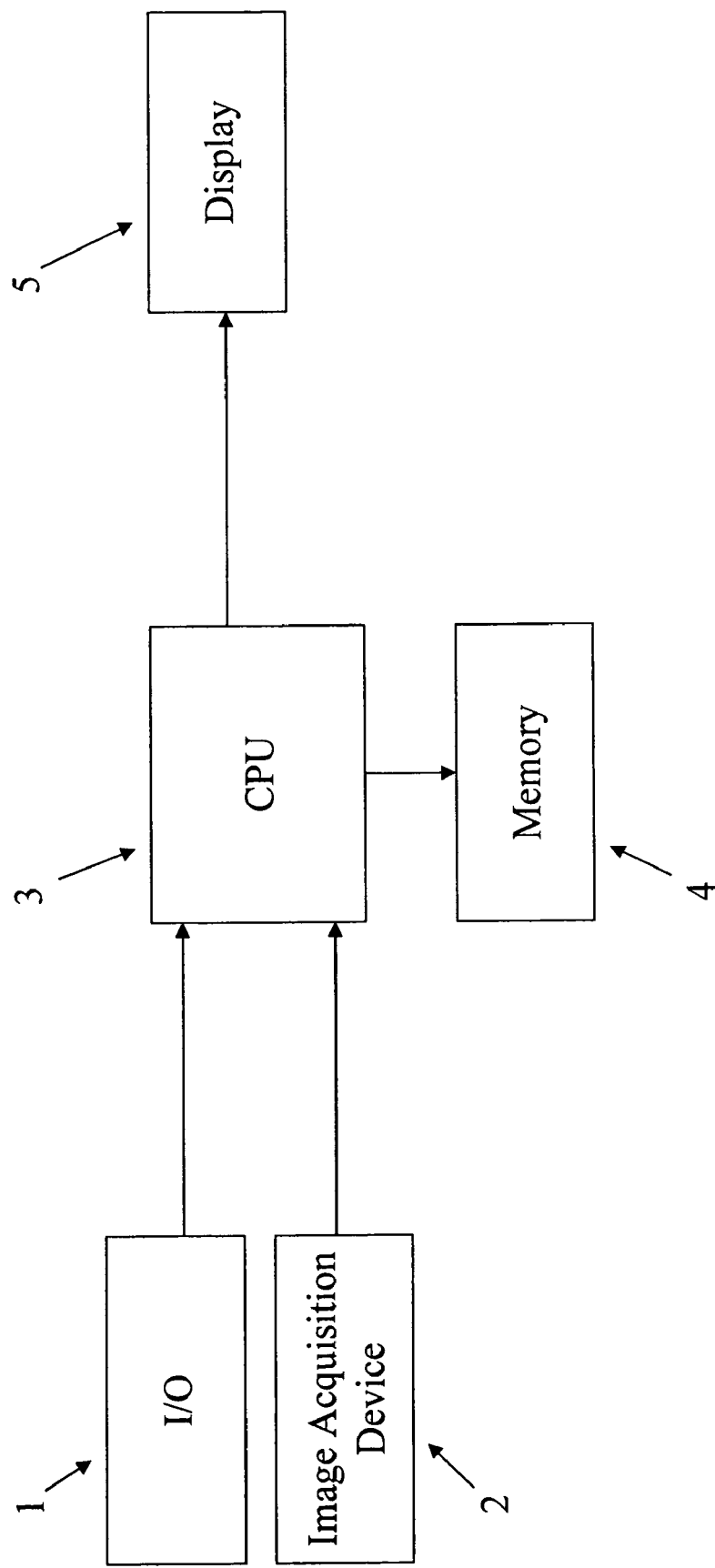
FIG. 2. is a diagram of a computer system that may be used to implement the invention.

FIG. 2 illustrates a general purpose system that may be utilized to perform the methods and algorithms disclosed herein. The system shown in FIG. 2 includes an Input/Output (I/O) device 1, an image acquisition device 2, a Central Processing Unit (CPU) 3, a memory 4, and a display 5. This apparatus and particularly the CPU 3 may be specially constructed for the inventive purposes such as a programmed digital signal processor (DSP), an application specific integrated circuit (ASIC), a field programmable gate array (FPGA) or special purpose electronic circuit, or it may comprise a general-purpose computer selectively activated or reconfigured by a computer program stored in the memory 4. Such a computer program may be stored in the memory 4, which may be a computer readable storage medium, such as, but is not limited to, any type of disk (including floppy disks, optical disks, CD-ROMs, and magnetic-optical disks) or solid-state memory devices such as a read-only memory (ROM), random access memory (RAM), EPROM, EEPROM, magnetic or optical cards, or any type of computer readable media suitable for storing electronic instructions.

The algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description herein. In addition, the present invention is not described with reference to any particular programming language. It will be appreciated that a variety of programming languages may be used to implement the teachings of the invention as described herein.

Figure 1:
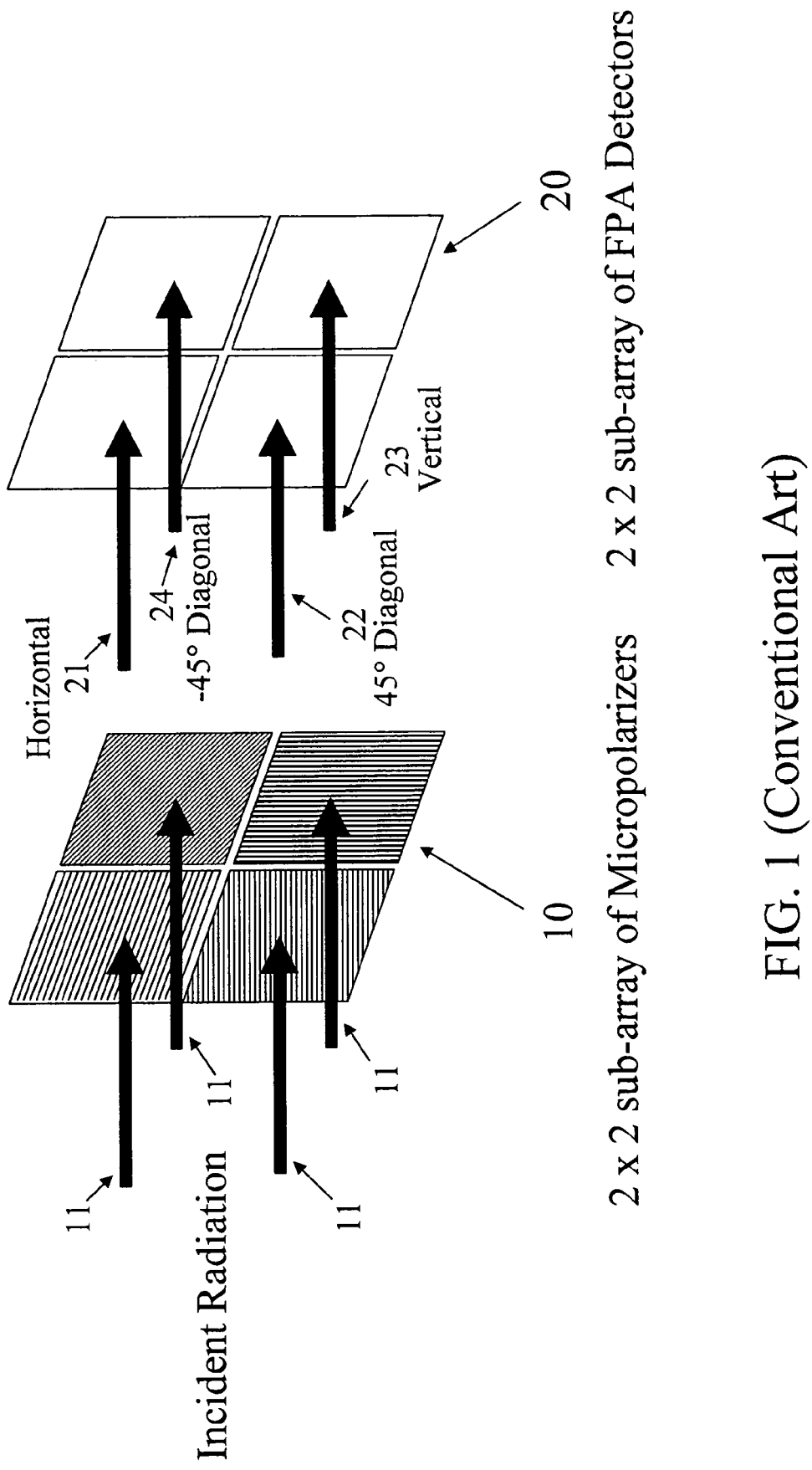
FIG. 1. is a diagram of pixels that form a conventional 2×2 sub-array of a micro-polarized Focal-Plane-Array (FPA) sensor.

In a preferred embodiment of the invention, the image acquisition device 2 may utilize a conventional focal-plane-array detector (e.g., as described in FIG. 1). The FPA allows the image acquisition device to obtain under-sampled image data having multiple polarization images.

It is well known that the polarimetric image may be used to detect and classify targets in an image because man-made objects typically emit and/or reflect a linearly polarized light more than an unpolarized light. In addition, the polarized light is often characterized by Stokes Parameters, degree of linear polarization (DOLP) and angle of polarization (AOLP), as well as other parameters that may be derived from basic polarization measurements, such as H, V, +45-degree and −45-degree linear polarization measurements. The angular information in AOLP gives information about the orientation of target surfaces and may be used to define physical characteristics of the target, such as shape, size, texture, etc. Man-made targets typically produce responses with higher DOLP than most natural objects because of their smooth surfaces. This phenomenon can be used to discriminate targets from clutter. In general, polarization metrics can be very useful in target detection and classification, either directly or when combined to form derivative features. However, two major problems associated with polarimetric imaging make the application of this technology more difficult; the first problem is degradation of SNR during image acquisition, and a second problem is inaccurate registration of the fundamental polarization measurements from which all other features are derived.

Specifically with a micro-polarizer FPA, problems common in polarimetry are reduced SNR due to the polarizing filters and the need to enlarge the PSF to encompass all of the basic polarization elements, and misregistration of the polarization measurements by the detector spacing because the multiple polarized detector elements are adjacent rather than co-axial with respect to the incident light. The enlargement of the PSF also results in reduced image resolution. The SNR is reduced from the PSF being spread over a 2×2 array of detectors 20 with corresponding decrease in signal sensitivity on each pixel sensor/detector. Instead of utilizing maximum resolution of the image detector by dedicating one pixel sensor/detector per pixel, the FPA method dedicates four sub-pixels into single pixel information that includes the set of polarization measurements as shown in FIG. 1. An incident radiation 11 is filtered through 2×2 sub-array of Micropolarizers 10, which polarize the incident beam into horizontal 21, vertical 23, +45° diagonal 24, and −45° diagonal 22 polarization beams. The 2×2 sub-array of FPA detectors 20 provides all four polarizations for a single resolvable beam. And since the 2×2 sub-array FPA detector arrangement for image acquisition provides only one image pixel information set for every 4 detector sensors, the spatial resolution of the image is degraded by a factor of 2 in each direction of the 2D image.

Embodiments of the invention overcome both the aforementioned resolution degradation and the SNR problem through two principles: the PSF is sized to closely match the dimensions of the array sensor elements (the individual pixel of the sub-arrays), and several input frames are integrated in order to increase SNR and overcome the detrimental effects of aliasing. The input frames are dithered in order to produce a collection of under-sampled image frames for each polarization. The images are under-sampled because the PSF closely matches the sensor elements, but there is a spacing of typically twice the element spacing between samples of a single polarization image. The under-sampling causes the images to contain aliasing noise, and the dithering causes the aliasing noise to be random and essentially uncorrelated. A 2D dither shift is estimated and used to register each of a set of frames to a common reference frame, and the set are integrated, reducing both sensor noise and aliasing noise. The registration process re-samples the images at smaller sampling intervals than the under-sampled intervals, resulting in Nyquist-sampled images with reduced aliasing noise, improved sensor SNR, and resolution approaching the native resolution limitation of the sensor as matched to the sub-pixel size.

Figure 3:
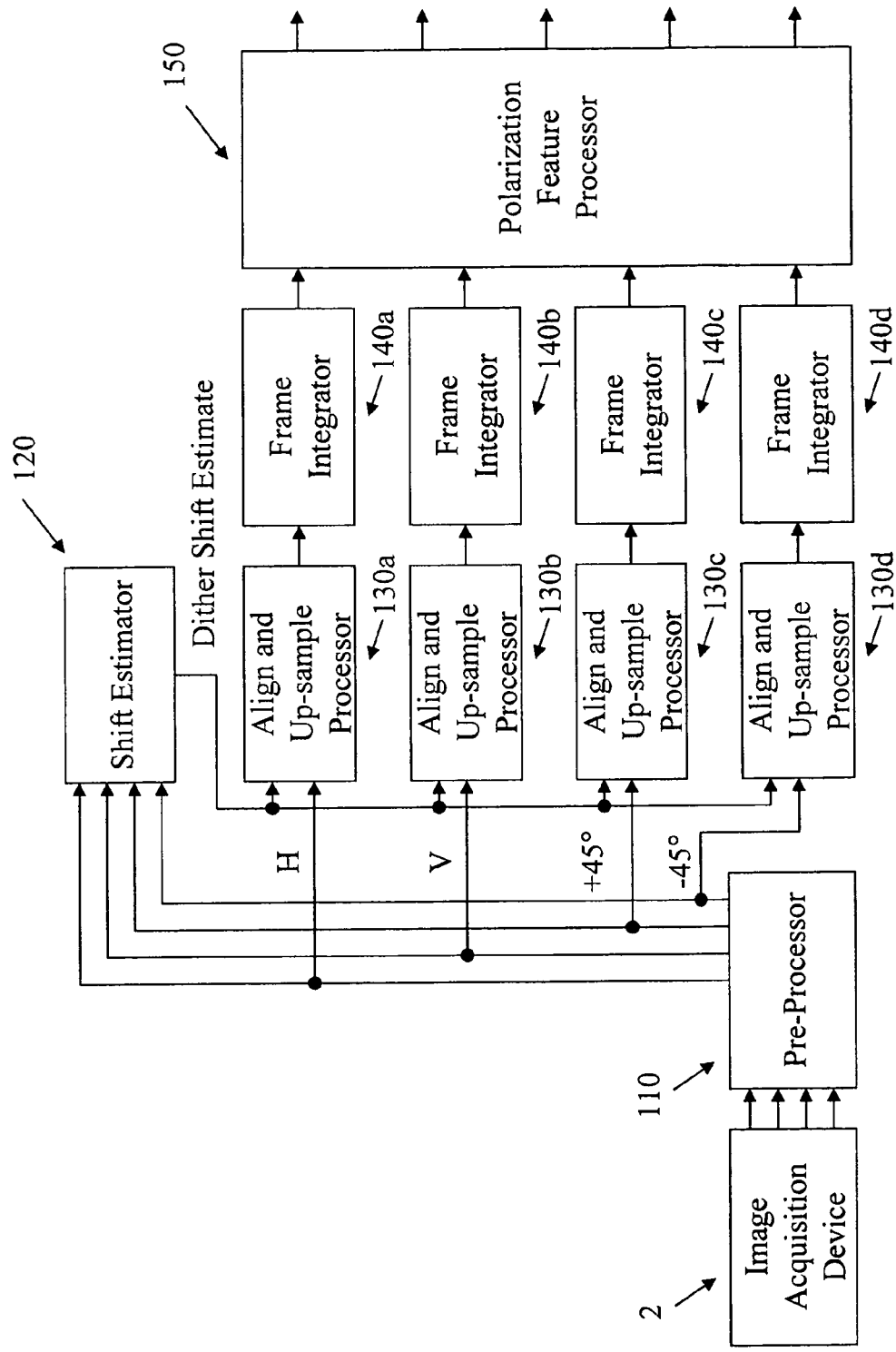
FIG. 3 is a high level block diagram illustrating an apparatus according to the invention.

As illustrated in FIG. 1, the Image Acquisition Device 2 made up of sub-arrays of pixels, delivers multiple under-sampled images to Pre-Processor 110 in FIG. 3. In a polarimetric system each of these image channels represents the response to a single polarization of light (e.g., 45-degree linear polarization). Each of the channels contributes to the derivation of a dither shift estimate by the Shift Estimator 120. Each of the channels' image sets is processed separately by the Align and Up-Sample Processor 130a, 130b, 130c, 130d and Frame Integrator 140a, 140b, 140c, 140d to form a high-resolution, Nyquist-sampled, high-SNR integrated image. A Polarization Feature Processor 150 combines the corresponding pixels of the multiple channel improved images to form high-quality feature images.

Figure 4:
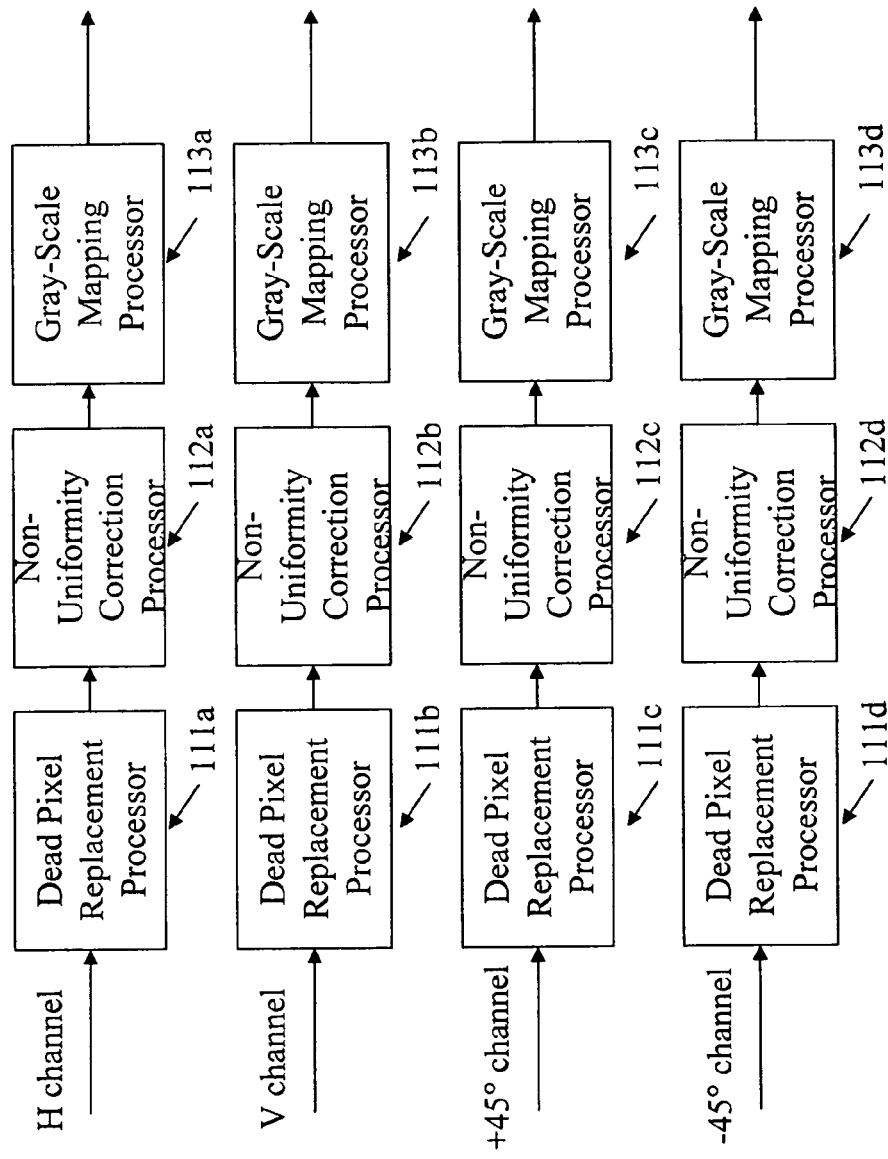
FIG. 4 is a mid-level block diagram showing the components of a Pre-Processor according to the invention.

As illustrated in FIG. 4, the Pre-Processor 110 is composed of elements designed to compensate for imperfections in the image sensor, such as dead pixels and non-uniform sensitivities and/or electrical offsets among the pixels. Various specific methods for Dead Pixel Replacement Processor 111a, 111b, 111c, 111d are well known and are not the subject of this invention. Various methods for Non-uniformity Correction Processor 112a, 112b, 112c, 112d for calibrating and correcting non-uniformities are also known, including scene-based non-uniformity correction (NUC), and are not the subject of this invention. A Gray-Scale Mapping Processor 113a, 1113b, 113c, 113d, both adaptive and non-adaptive is also well known as applying to improving the visual presentation of an image or as a useful precursor to automatic target recognition. These three elements of the Pre-Processor 110 are illustrated for completeness, but neither the principle nor the efficacy of the invention is dependent on their specific characteristics.

Figure 5:
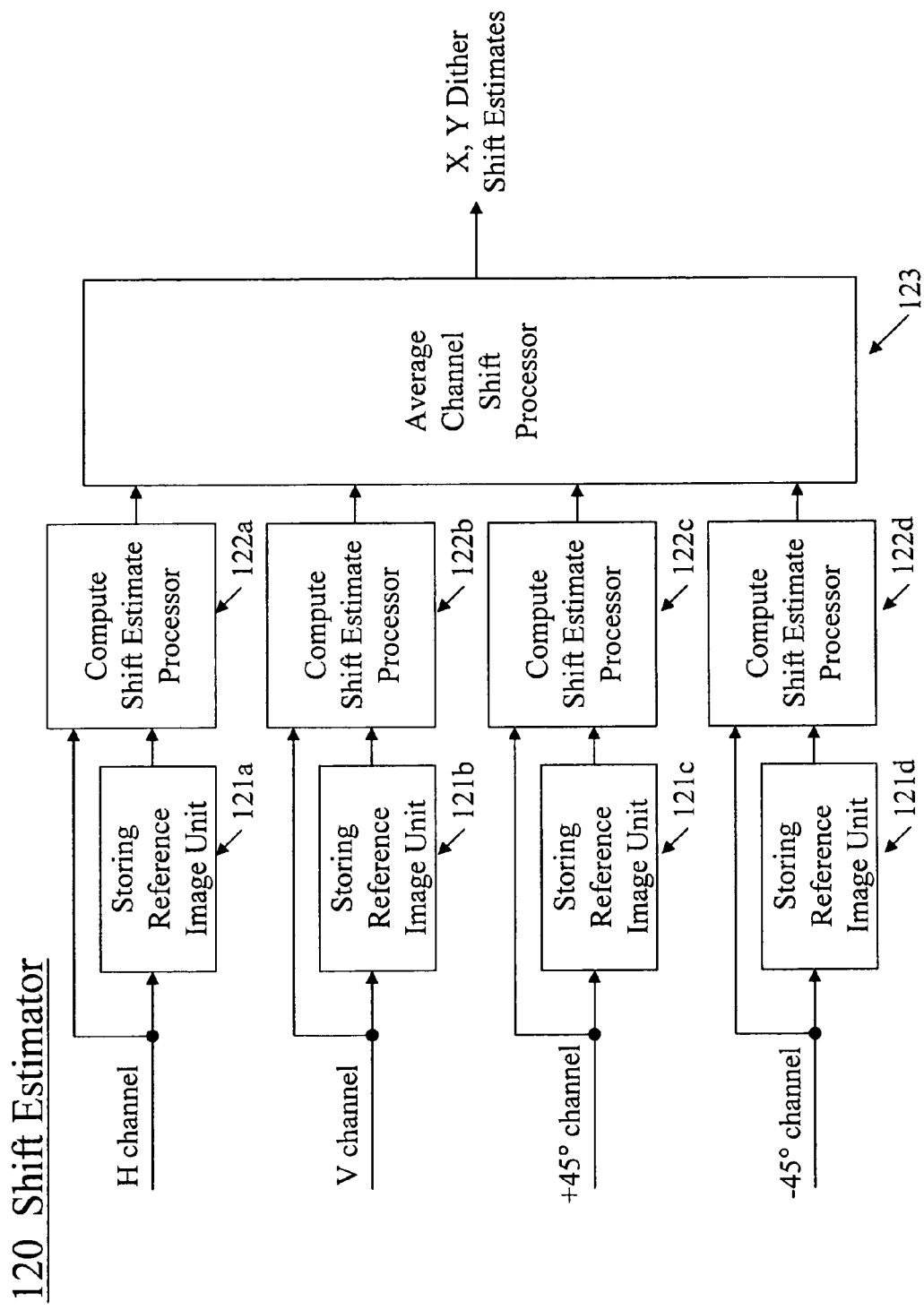
FIG. 5. is a mid-level block diagram showing the components of a Shift Estimator according to the invention.

FIG. 5 illustrates the components of the Shift Estimator 120. The processing of each channel is independent of the other channels before the averaging of the computed shift estimates. A Store Reference Frame Unit 121 stores the first frame of a set of sequential frames to be used as a reference to compare to subsequent frames in the set. In some implementations of the invention, the Store Reference Frame Unit 121 may update the reference image by substituting the latest integrated frame out of Frame Integrator 140 for the same channel.

A Compute Shift Estimate Processor 122 generates a measure of the 2D (x and y) shifts of the current frame into Shift Estimator 120 relative to the stored reference frame from the Store Reference Frame Unit 121. In a preferred implementation of the invention, the estimates from all the channels are averaged in the Compute Shift Estimate Processor 122 to produce the estimate of the shifts induced by the dither motion of the sensor that has occurred between the first (reference) frame and the current frame.

Figure 6:
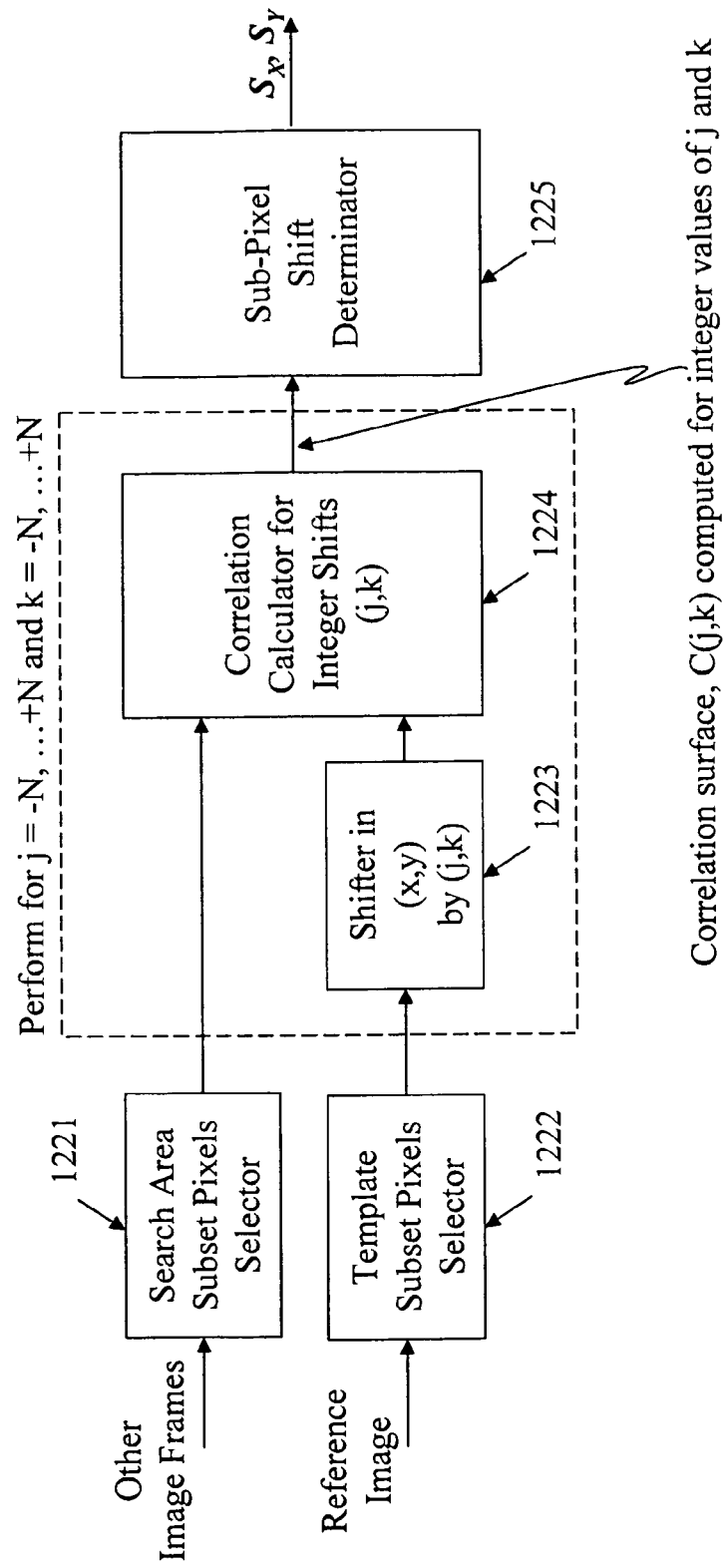
FIG. 6. is a block diagram of showing the components of a Compute Shift Processor according to the invention.

FIG. 6 shows more detail of Compute Shift Estimate Processor 122. Pixels from a chosen rectangular area of the current image are selected by Search Area Subset Pixels Selector 1221 and will be referred to as the "search area." The pixels extracted from a corresponding but smaller area of the reference image by Template Subset Pixels Selector 1222 will be referred to as the "template." (Since the selection of reference frame pixels does not change during the integration of a set of images, it may be efficient to combine 1222 with 1221.) The rectangle of pixels chosen from the search area by 1221 is 2×N greater in each dimension than that of the template. It is preferable to allow a measure of correlation to be computed by a Correlation Calculator 1224 for shifts of the template relative to the search area produced by Shifter 1223. These shifts are integer shifts from −N to +N in each dimension. The correlation measures produced by the Correlation Calculator 1224 for the combinations of x and y integer shifts are stored as a 2N-by-2N sampled correlation surface. A Sub-Pixel Shift Determinator 1225 produces a 2D shift estimate with sub-pixel resolution that is the shift corresponding to the peak of a mathematical model of the correlation surface. In one preferred embodiment of the invention, the model is composed of separate 1D least-squares quadratic fits to the 3×3 section of the sampled correlation surface that is centered on the maximum integer correlation value. The shift value is determined as the value for which the derivative of the quadratic fit is zero.

Figure 7:
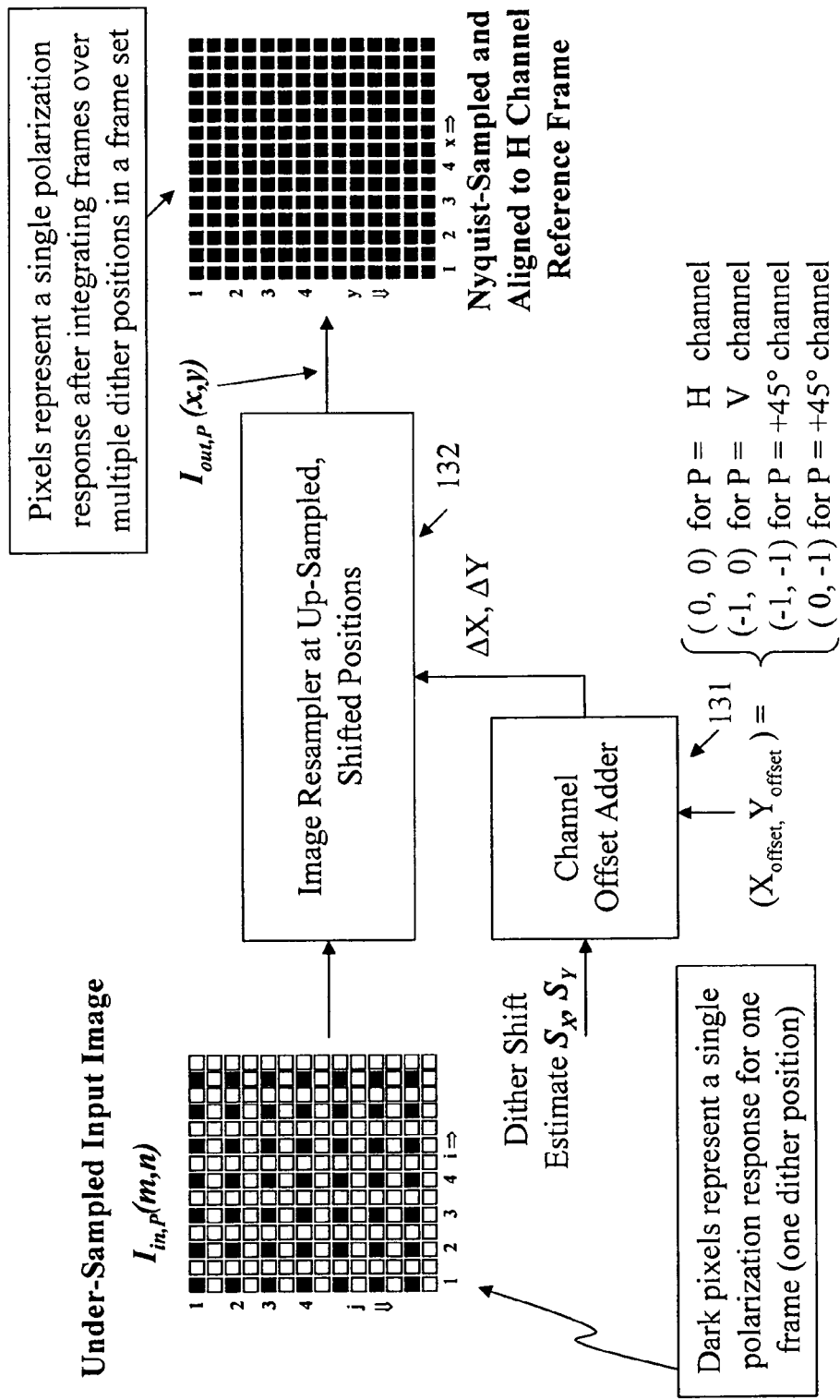
FIG. 7. is a block diagram showing the components of an Align and Up-Sample Processor according to the invention.

FIG. 7 shows the details of the Align and Up-Sample Processor 130, wherein for each channel, a frame of input polarimetric image data is a randomly dithered frame containing an under-sampled image for one of the (typically four) polarizations. The first image frame of a set of images to be integrated is assigned as a reference frame that defines reference coordinates for that set of images. Subsequent image frames are aligned to the reference frame and to each other using the dither shift estimate for that frame from the Compute Shift Estimate Processor 122. In the same process, each of the channels are also aligned to a reference channel (e.g., the H channel) by the addition in Channel Offsets Adder 131 of the fixed, known polarization misregistration of that channel relative to the reference channel to the dither shift estimate. The alignment according to the combined dither and misregistration shift is accomplished by Image Resampler at Up-Sampled, Shifted Positions 132. This resample operation for a given channel is performed as an interpolation of the under-sampled data from that channel. In a preferred embodiment of the invention, bilinear interpolation is used according to the following equations:

$$I_{out}(x,y) = A \cdot I_{in}(m,n) + B \cdot I_{in}(m+1,n) + C \cdot I_{in}(m,n+1) + D \cdot I_{in}(m+1,n+1)$$

for x=1, 1.5, 2, 2.5, 3, 3.5, . . . and y=1, 1.5, 2, 2.5, 3, 3.5, . . .

where $m = \text{floor}(x - \Delta X)$, $n = \text{floor}(y - \Delta Y)$, $\delta x = x - \Delta X - m$, $\delta y = y - \Delta Y - n$ and $A = 1 - \delta x - \delta y + \delta x \delta y$, $B = \delta x \cdot (1 - \delta y)$, $C = \delta y \cdot (1 - \delta x)$, $D = \delta x \delta y$ where $I_{out}$ is an output image with coordinates (x,y), $I_{in}$ is a current under-sampled input image with frame coordinates (m,n), and $\Delta X$ and $\Delta Y$ represent the result of channel offset adder 131.

This produces samples at twice the sample rate in each dimension so that the Nyquist criterion is fulfilled. Although the up-sampled image is Nyquist-sampled during the resample operation of the Image Resampler at Up-Sampled, Shifted Positions 132, the up-sampled image contains aliasing noise due to the original image being under-sampled. Because the dither changes frame-to-frame, this aliasing noise is uncorrelated from frame-to-frame so that subsequent integration of frames attenuates the aliasing noise power (as well as the sensor noise power) by the inverse of the number of frames integrated.

Figure 8:
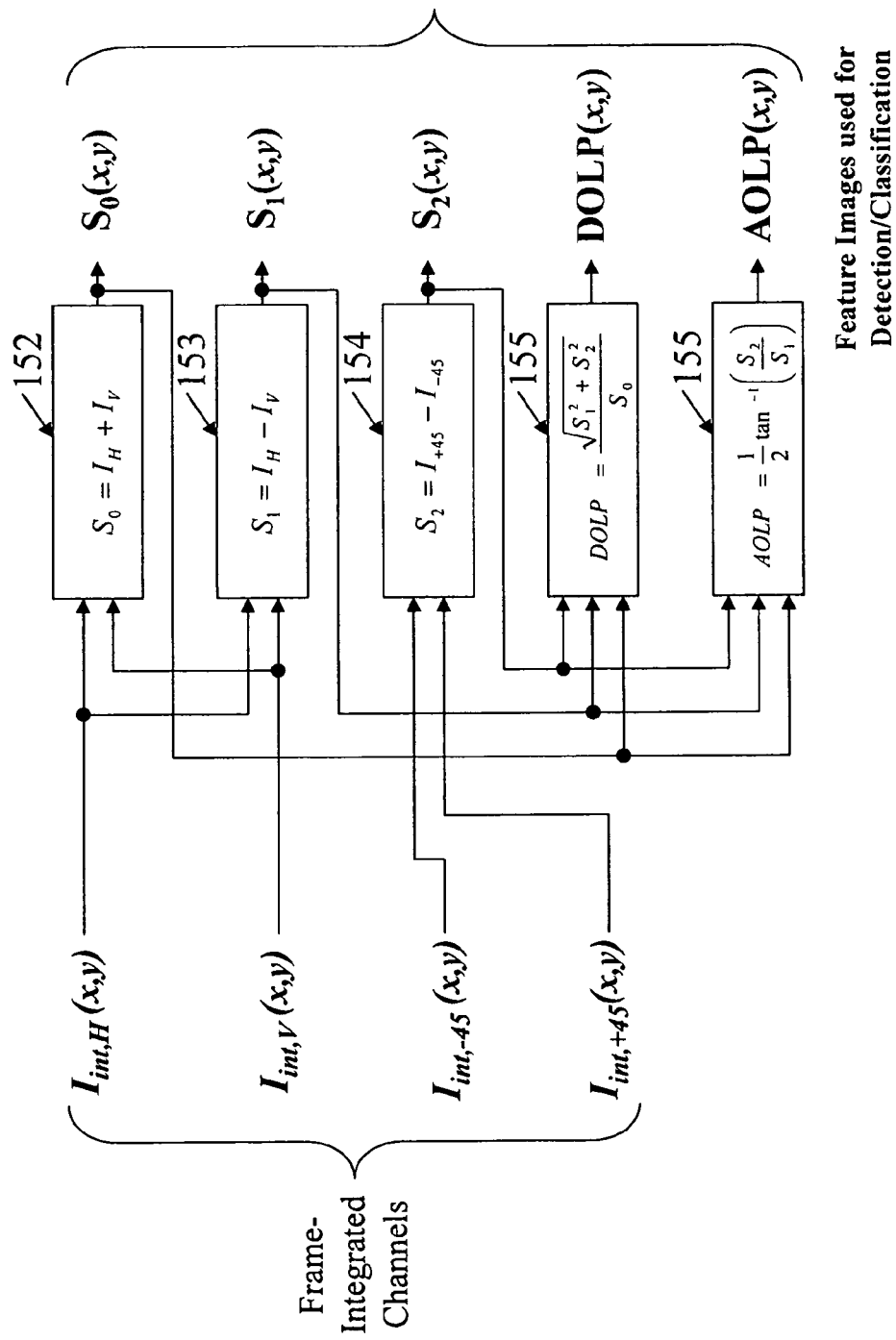
FIG. 8. is a mid-level flow diagram showing the components of a Form Polarization Feature Processor according to the invention.

As FIG. 3 illustrates, the Nyquist-sampled, integrated images generated from Align and Up-sample Processor 130a, 130b, 103c, 130d are integrated by Frame Integrator 140a, 140b, 140c, 140d for each channel. The corresponding pixels from each channel are then combined into features that are useful for detection or classification of targets. For the case in which the channels are linearly polarized, typical features are Stokes parameters, DOLP, and AOLP. These are formed by the Polarization Feature Processor 150 (FIG. 3). Details and equations for the formation of these parameters are shown in FIG. 8.

Objectives of this invention include solving both poor SNR and misregistration of polarimetric measurements when using division-by-FPA imaging. The process involves inputting frames dithered in both azimuth and elevation (x and y) to generate a high-definition, Nyquist-sampled, integrated image for each of the polarizations or wavebands. The integration addresses the need to improve the SNR. The method of re-sampling and integration transforms individually under-sampled, high-resolution image frames into resultant high-resolution frames that meet the Nyquist-sampling criterion. In the process of re-sampling, each polarization channel is aligned to allow precise registration to the other polarizations. Registration shifts are the sum of 2D dither estimates and simple fixed offsets defined by the arrangement of the polarized or waveband-specific sub-array pixel arrangement in the FPA. In the most straight-forward implementation, the fixed offsets would be integer shifts in X and Y.

The invention being thus described, it will be obvious that the same may be varied in many ways. Such variations are not to be regarded as departure from the spirit and scope of the invention, and all such modifications as would be obvious to one skilled in the art are intended to be included within the scope of the following claims.

The invention claimed is:

1. An image processing method, comprising;
   inputting a sequence of angular-position-dithered frames of data, each frame consisting of under-sampled multi-polarization images;
   estimating pixel shifts for each of the angular-position-dithered frames relative to the position of the first frame of the sequence of frames;
   aligning and up-sampling the current frame for each polarization image to produce over-sampled data in a reference frame defined by the first frame of the sequence, wherein the aligning and up-sampling steps include:
   computing a registration shift $\Delta X$, $\Delta Y$, for each polarization channel that is the sum of a fixed and known polarization-channel registration offset and the current frame's estimated pixel shifts due to dither;
   interpolating and up-sampling the current frame for each polarization channel using registration shift $\Delta X$, $\Delta Y$ to generate pixel data that is over-sampled and registered to the reference frame;
   integrating the registered, over-sampled images for each polarization channel for the sequence of frames; and
   outputting features formed by combining the polarization channels, pixel-by-pixel, to form an image of polarization features.

2. The method of image processing according to claim 1, further comprising;
   a pre-processing step including:
   replacing dead pixels in the under-sampled input image data,
   correcting non-uniformity of the under-sampled input image data, and
   mapping gray-scale of the under-sampled input image data.

3. The method of image processing according to claim 1, wherein the computing shift estimates for each polarization image further comprises:
   selecting search area subset pixels from the current frame;
   selecting template subset pixels as the reference frame;
   determining the shift of the reference frame;
   correlating the current frame with respect to the shift of the reference frame; and
   determining dithered shift estimates, $S_x$, $S_y$.

4. The method of image processing according to claim 1, wherein the outputting step outputs the resultant image by combining each polarization image based on Stokes Parameters.

5. The method of image processing according to claim 1, further comprising displaying the resultant image.

6. The method of image processing according to claim 1, wherein the multiple polarization images includes horizontal channel H, vertical channel V, positive diagonal channel +45, and negative diagonal channel −45 polarization images.

7. The method of image processing according to claim 1, wherein the shift estimating steps includes:
   estimating each of the angular-position-dithered polarization images independently of the other polarization images,
   storing a first frame of the polarization images in a store reference unit as a reference frame,
   computing shift estimates of a current frame relative to the reference frame, and
   averaging channel shifts to obtain dither shift estimates $S_x$, $S_y$.

8. A image processing apparatus, comprising;
   an image input device that inputs a sequence of angular-position-dithered frames, each frame consisting of under-sampled multi-polarization images;
   a shift estimator that estimates a shift for each angular-position-dithered frame for each of the multiple polarization images;
   an align and up-sample processor that aligns the current frame with reference frame coordinates defined by the first frame wherein,
   the align and up-sample processor further includes:
   a channel offset adder that adds a known polarization registration offset to the dithered shift estimates, $S_x$, $S_y$, and
   an image resampler at up-sampled, shifted positions that resamples the current frame, combines the resampled current frame with the registered and up-sampled images from other frames; and
   a polarization feature processor that combines the multiple polarization images to form a resultant image of polarization features.

9. The image processing apparatus according to claim 8, further comprising;
   a pre-processor that pre-processes input image data, which further includes:
   a dead pixel replacement processor that replaces dead pixels in the under-sampled input image data,
   a non-uniformity correction processor that corrects non-uniformity of the under-sampled input image, and
   a gray-scale mapping processor that maps gray-scale of the under-sampled input image.

10. The image processing apparatus according to claim 8, wherein the compute shift estimate processor further comprises:
    a search area subpixels selector that selects search area subset pixels from the current frame;
    a template subset pixels selector that selects template subset pixels from the reference frame,
    a shifter that determines the shift of the reference frame;
    a correlation calculator that calculates a correlation between the current frame with respect the shift of the reference frame; and
    a sub-pixel shift determinator that determines dithered shift estimates, $S_x$, $S_y$.

11. The image processing apparatus according to claim 8, wherein the polarization features processor combines each polarization image based on Stokes Parameters to form the resultant image.

12. The image processing apparatus according to claim 8, further comprising a display to display the resultant image.

13. The image processing apparatus according to claim 8, wherein the multiple polarization images includes horizontal channel H, vertical channel V, positive diagonal channel +45, and negative diagonal channel −45 polarization images.

14. The image processing apparatus according to claim 8, wherein the shift estimator estimates a shift for each angular-position-dithered multiple polarization image independently of the other polarization images wherein the shift estimator further includes:
    a storing reference image unit that stores a first frame of the polarization images as a reference frame,
    a compute shift estimate processor that estimates shifts of a current frame relative to the reference frame, and an average channel shift processor to obtain dither shift estimates, $S_x$, $S_y$.

15. A computer-readable storage medium having a computer program stored therein, the computer program when executed causes a computer to perform a steps of:
inputting a sequence of angular-position-dithered frames of data, each frame consisting of under-sampled multi-polarization images;
estimating pixel shifts for each of the angular-position-dithered frames relative to the position of the first frame of the sequence of frames;
aligning and up-sampling the current frame for each polarization image to produce over-sampled data in a reference frame defined by the first frame of the sequence, wherein the aligning and up-sampling steps include:
computing a registration shift $\Delta X$, $\Delta Y$, for each polarization channel that is the sum of a fixed and known polarization-channel registration offset and the current frame's estimated pixel shifts due to dither;
interpolating and up-sampling the current frame for each polarization channel using registration shift $\Delta X$, $\Delta Y$ to generate pixel data that is over-sampled and registered to the reference frame;
integrating the registered, over-sampled images for each polarization channel for the sequence of frames; and
outputting features formed by combining the polarization channels, pixel-by-pixel, to form an image of polarization features.

16. The computer-readable storage medium according to claim 15, further comprising;
a pre-processing step including:
replacing dead pixels in the under-sampled input image data,
correcting non-uniformity of the under-sampled input image data, and
mapping gray-scale of the under-sampled input image data.

17. The computer-readable storage medium according to claim 15, wherein the computing shift estimates for each polarization image further comprises:
selecting search area subset pixels from the current frame;
selecting template subset pixels as the reference frame;
determining the shift of the reference frame;
correlating the current frame with respect to the shift of the reference frame; and
determining dithered shift estimates, $S_x$, $S_y$.

18. The computer-readable storage medium according to claim 15, wherein the outputting step outputs the resultant image by combining each polarization image based on Stokes Parameters.

19. The computer-readable storage medium according to claim 15, further comprising displaying the resultant image.

20. The computer-readable storage medium according to claim 15, wherein the multiple polarization images includes horizontal channel H, vertical channel V, positive diagonal channel +45, and negative diagonal channel −45 polarization images.

21. The computer-readable storage medium according to claim 15, wherein the shift estimating steps includes:
estimating each of the angular-position-dithered polarization images independently of the other polarization images,
storing a first frame of the polarization images in a store reference unit as a reference frame,
computing shift estimates of a current frame relative to the reference frame, and
averaging channel shifts to obtain dither shift estimates $S_x$, $S_y$.

* * * * *